United States Patent [19]

Greuel, Jr.

[11] 4,234,020
[45] Nov. 18, 1980

[54] HEAT RECOVERABLE CLOSURE ASSEMBLY AND METHOD

[75] Inventor: Walter J. Greuel, Jr., Pleasanton, Calif.

[73] Assignee: Raychem Corporation, Menlo Park, Calif.

[21] Appl. No.: 967,030

[22] Filed: Dec. 6, 1978

[51] Int. Cl.³ ............................................. F16L 9/14
[52] U.S. Cl. .................................... 138/166; 138/170
[58] Field of Search ................ 138/99, 166, 156, 157, 138/158, 162, 170, 128; 174/DIG. 8

[56] References Cited

U.S. PATENT DOCUMENTS

| 790,644 | 6/1904 | Lloyd | 138/156 |
|---|---|---|---|
| 3,455,336 | 7/1969 | Ellis | 138/156 |
| 3,507,977 | 4/1970 | Pusey | 174/DIG. 8 |
| 3,991,243 | 11/1976 | Biddell | 138/156 |

Primary Examiner—Lenard A. Footland
Attorney, Agent, or Firm—Lyon & Lyon

[57] ABSTRACT

A wrap-around closure assembly for elongate objects such as pipelines including a length of heat recoverable material as the closure member and a fastening device extending lengthwise along the elongate object for holding the edges of the material in a nearly abutting relationship. The fastening device has channels which receive the edges of the heat recoverable material such that the retaining forces of the fastening device are in line with the tensile forces of the recovered closure member. Retaining means within the channels prevent the withdrawal of the edges during assembly and after heat recovery of the closure member. The legs of the channels are also forced against the interposed closure member to prevent extraction thereof.

16 Claims, 14 Drawing Figures

HEAT RECOVERABLE CLOSURE ASSEMBLY AND METHOD

BACKGROUND OF THE INVENTION

This invention relates to a wrap-around closure assembly for elongate objects. More specifically, this invention relates to a closure assembly including a heat recoverable closure member and a fastening means.

It is often advantageous to provide wrap-around insulation, protective closures, bundling assemblies or joint seals for elongate conduits, pipes, cables and the like which do not have a readily accessible end over which a conventional tubular closure can be drawn. In such instances, a split closure member has often been employed. The split closure is wrapped about the substrate and the two edges are then held relative to one another. Preferably some sealing device has been employed at the edges to prevent environmental intrusion. Often the closure member is of a heat recoverable material and once the edges are fixed relative to one another, the heat recoverable material is brought to the temperature of recovery. The closure member then contracts to tightly conform to the substrate in a tensioned condition.

A number of such wrap-around closures have been developed in an attempt to satisfy particular use requirements and at the same time provide an inexpensive, easily assembled closure means giving a high degree of reliability in use. Examples of such wrap-around closures fabricated from heat recoverable material are described in U.S. Pat. No. 3,379,318 to Conde; U.S. Pat. No. 3,455,336 to Ellis; U.S. Pat. No. 3,530,898 to Wilson; U.S. Pat. No. 3,542,077 to Muchmore; U.S. Pat. No. 3,770,556 to Evans et al; U.S. patent application Ser. No. 603,636, filed Aug. 11, 1975, to Jervis; U.S. patent application Ser. No. 436,674, filed Jan. 25, 1974, to Naidoff and U.S. patent application Ser. No. 530,687, filed Dec. 9, 1974 Biddell, all assigned to the assignee of the present invention. These several disclosures are all incorporated herein by reference.

In spite of the success of the aforementioned wrap-around closure members, certain difficulties remain. Some of the prior devices have required special fabrication of the edges of the sheet-like closure members to accommodate the specific fastening means employed. Such special fabrication includes ridges at each edge, button and buttonholes, interlocking members and the like. These specially fabricated edges in most instances require that the width of the closure member be predetermined for a specific size of substrate. Closure members cannot be cut to size in the field when a special edge is employed. Furthermore, added fabrication steps, die complexities and the like are also required in the production of closure members with special edge requirements. Naturally, the fabrication of a simple sheet as a closure member is far more advantageous and inexpensive.

Prior closure assemblies have also often necessitated special assembly techniques requiring careful attention to detail to insure a proper closure. With certain closure members, modifications must be performed in the field. Such modifications are time consuming and may lead to improper assembly. Other closure devices require a close-fitting of a fastening means over the closure member. Such close fits lead to difficulty in assembly and increase the possiblity of error in either manufacturing or assembly resulting in the effecting of an incomplete closure.

When heat recoverable closure members are employed, another difficulty arises in completing the closure. Once the closure member has been assembled with the fastening means, it is necessary to heat recover the closure member so that it will tightly conform to the substrate. In doing so, tensile forces are developed in the closure member which are resisted by the fastening means holding the edges of the closure member fixed relative to one another. In certain of the wrap-around closure devices, the fastening means, in resisting the tensile loading of the recovering closure member, inherently develop twisting moments resulting from a misalignment of the tensile forces induced in the closure member and the resisting forces imposed by the fastening means. In some instances, a resulting twisting of the edge of the closure member allows it to extract itself from the fastening means. To overcome this problem with such wrap-around assemblies, close attention to assembly detail and close tolerances between the closure member and the fastening means are required. All of these difficulties naturally increase the cost of both fabrication and assembly and further increase the possibility of effecting an incomplete closure.

SUMMARY OF THE INVENTION

The present invention is directed to a heat recoverable closure assembly of the wrap-around variety which employs a closure member that does not require special edge configurations or field modification for assembly. The closure member is of simple sheet material having the property of heat recoverability. The simple closure member is associated with a fastening means of the present invention which provides channels for receipt of the simple edges of the closure member. The channels are constructed and arranged to tightly grip the closure member such that bending moments are not encountered by the closure member upon heat recovery thereof. The sheet material may be easily cut in the field when necessary to specifically fit a given substrate or series of substrates regardless of changes in the substrate's peripheral length or variations in the sizes of several substrates to be covered. The edges of the sheet material are then easily forced into the fastening means followed by heat recovery. Thus, a versatile, easily manufactured and easily assembled closure system is provided by the present invention overcoming the disadvantages of prior wrap-around closures. Certain other embodiments related to the concepts of the present invention are also described in U.S. patent application, HEAT RECOVERABLE CLOSURE ASSEMBLY AND METHOD, Ser. No. 967,023, filed Dec. 6, 1978 to Diaz et al, the disclosure of which is incorporated herein by reference.

Accordingly, it is an object of this invention to provide an improved heat recoverable closure assembly.

It is another object of the present invention to provide a heat recoverable closure assembly employing a simple sheet of closure material.

It is a further object of the present invention to provide a heat recoverable closure system which is easily assembled.

It is yet another object of the presennt invention to provide a heat recoverable closure assembly which does not develop bending moments in the closure member during heat recovery thereof.

Moreover, it is an object of the present invention to provide an improved fastening means for a heat recoverable closure assembly.

It is also an object of the present invention to provide an improved method for effecting a closure.

Other objects and advantages will appear hereinafter.

DETAILED DESCRIPTION OF THE PREFERRED EMBODIMENTS

Figure 1:
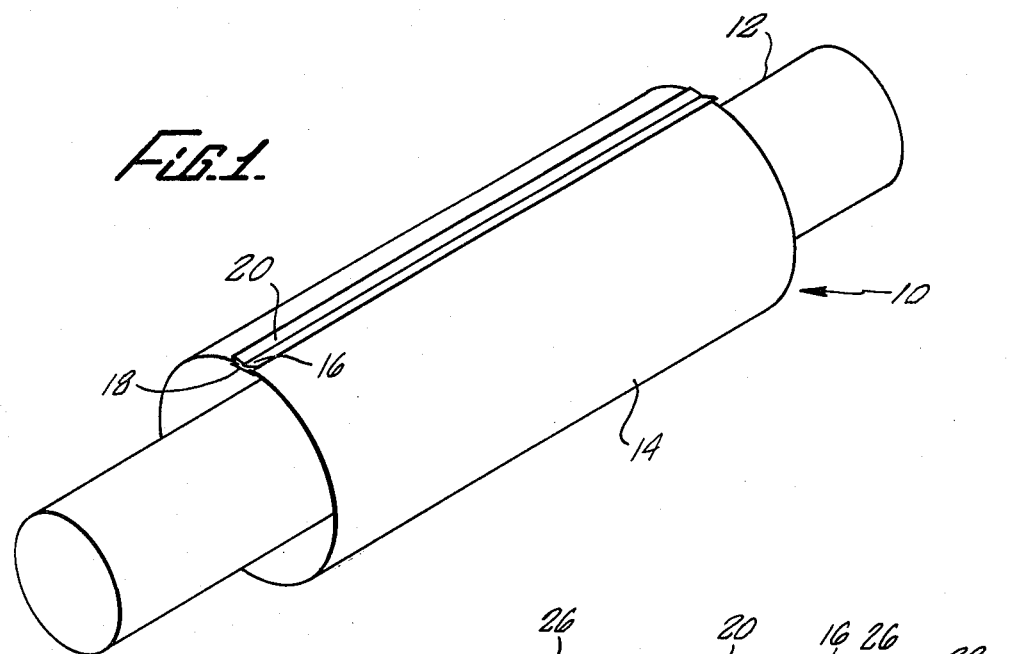
FIG. 1 is a perspective view of a heat recoverable closure assembly according to the present invention as positioned around a substrate prior to heat recovery.

Turning in detail to the drawings, FIG. 1 depicts a first embodiment of the heat recoverable closure assembly formed in accordance with the present invention as it is positioned about a substrate. The closure assembly, generally designated 10, is in its unrecovered state and thus is loosely disposed about the substrate 12. For clarity in the drawings, the closure assembly 10 is shown to be relatively short in length. It is to be understood that the closure assemblies can be of much greater length. Furthermore, the diameter of the assembly can be of any required size to accommodate any given substrate 12. Naturally, the proportional size of the fastening means relative to the closure member will greatly depend on the diameter of the closure assembly and the tensile loadings experienced by the closure assembly during heat recovery.

The closure assembly 10 includes a closure member 14 provided by a simple sheet of recoverable material. Within the scope of this invention, a heat recoverable material is regarded as being a material which has been changed from an original dimensionally heat stable state to a dimensionally heat unstable state capable of reverting to its original form upon the application of heat. The capability of reverting to the original form can be referred to as an "elastic memory". Preferred for use in this invention are heat recoverable sheets which shrink to a smaller dimension as measured between the edges to be brought into a nearly abutting relationship. The longitudinal dimension of the sheet is intended to remain substantially constant upon heat recovery while the thickness of the sheet will increase as the shrinkage occurs. Examples of such heat recoverable materials are described in U.S. Pat. No. 3,086,242, to Cook et al, the disclosure of which is incorporated herein by reference.

Generally speaking, a material having the property of heat recoverability can be obtained by raising a suitable polymeric material to a temperature above its crystalline melting point or range. At this temperature, it is stretched and then cooled while in its stretched dimensions. However, above its crystalline melting temperature, if unrestrained, the material exhibits "elastic memory", i.e., it will revert to substantially its prestretched dimensions. Polymeric materials that have been crosslinked by chemical means or by irradiation, for example, with high energy electrons or nuclear radiation, are preferred for use in the present invention although other polymeric materials capable of having heat recoverability imparted thereto can also be employed.

Heat recoverable material such as described above can readily be obtained at essentially endless lengths and stored conveniently as rolls. Closure member 14 can be cut from such a roll or other long sheet in the length and width desired. These dimensions are usually dictated by the requirements of the elongated object about which the closure is to be recovered and are readily determined by those skilled in the art. Once cut to the proper dimensions, the closure member can be employed without further modification or treatment of the type required in prior art assemblies.

The closure assembly 10 includes, with the closure member 14, a fastening means for cooperating with the closure member 14 to retain the edges in a nearly abutting relationship. The fastening means in the embodiment of FIG. 1 is fabricated from two metal plates 16 and 18 joined at their centerlines by a series of spot welds 20. The plates 16 and 18 are preferably of a resilient metallic nature. Sheet steel has been found to be a preferred material for this use. Naturally, the plates 16 and 18 may be joined by other than spot welds 20. Other welding techniques, rivets and even adhesives may be found appropriate in certain instances.

The two plates 16 and 18 extend laterally from the centerline thereof to form gripping means for holding the edges 22 and 24 of the closure member 14. The gripping means, defined by the plates 16 and 18, each include a first leg member 26 and a second leg member 28. The leg members 26 and 28 form a channel 30 running lengthwise along the closure assembly 10. In the embodiment of FIG. 1, two such channels 30 extend along either side of the closure member 14 for receipt of the edges 22 and 24. The fastening means may be of any convenient length and multiple numbers of the fastening means may be used by placing them end to end for association with the closure member 14.

The disposition of the channels 30 are such that the gripping means extend in opposite directions from one another to receive the edges 22 and 24. Thus, the edges 22 and 24 are brought into nearly abutting relationship with one another when they are assembled with the fastening means. The nearly abutting relationship causes the closure member to approach a common tangent at corresponding points at each edge 22 and 24. Thus, radial ridges extending from the general cylindrical shape of the closure member are avoided. However, configurations where the channel members are in other than a substantially opposed relationship are also contemplated by the present invention.

The employment of the channels 30 to receive the edges 22 and 24 of the closure member 14 also provides for the mutual alignment of the tensile loads created by the recovering closure member 14 and the constraining loads of the fastening means resisting the tensile loads. This alignment avoids the creation of any bending moments with the shrinkage of the closure member 14. As discussed above, such bending moments have a tendency to pull the edges 22 and 24 of a closure member 14 from the fastening means. By constructing the fastening means to avoid such moments, this problem is overcome.

To insure the integrity of the closure assembly 10, means are provided for forcing the legs 26 and 28 of each gripping means toward one another. In the embodiment of FIG. 1, this means is provided for by employing a resilient material in plate 16 as first leg member 26 and insuring that leg member 26 will be biased against the closure member 14 when the closure member is positioned within the channel 30. It is also advantageous to have the first leg member 26 biased against the second leg member 28 even without the closure member inserted therebetween. The biasing of the leg members 26 and 28 together creates a gripping of the closure member 14 such that substantial friction must be overcome to extract the edges 22 and 24 from the fastening means. This resistance to extraction is further increased when the closure member 14 is recovered because the closure member 14 will increase in thickness as it shrinks about the substrate 12.

To further insure the gripping of the edges 22 and 24 of the closure member 14, a retaining means is provided at the ends of at least the first leg member 26. In the embodiment of FIG. 1, a simple flange 32 extends inwardly from the first leg member 26 and toward the other leg member 28. The flange 32 is created by rolling the edges of plate 16. The included angle of the flange 32 may be as great as 90° but is preferably about 45° for optimizing retention capability and ease of assembly. Thus, the means for forcing the legs together and the retaining means cooperate to hold the edges 22 and 24 of the closure member 14 in nearly abutting relationship.

The closure member 14 is further retained in position in the fastening means upon heat recovery of the closure member 14. As the closure member 14 recovers to tightly enclose a substrate, the thickness of the sheet defining the closure member 14 will increase. The increase in sheet thickness necessarily increases the compression load imposed by the biased leg members 26 and 28 on the closure member 14 near edges 22 and 24.

Furthermore, the bias load on the closure member 14 near the edges thereof tends to prevent total recovery of the heat recoverable sheet material. Consequently, a notch coincident with the flange 32 tends to develop creating a slight interlocking of the closure member 14 with the gripping means.

To advantageously employ the increased thickness and the tendency to form a notch to insure retention of the closure member 14 in the fastening means, the area of the closure member around the fastening means may be heated to initiate recovery before the remainder of the closure member 14 is heated. In this way, recovery will occur first at the edges 22 and 24 to further hold the closure member in the fastening means. Only after at least partial recovery occurs near the edges 22 and 24 will any significant tension load, brought about by heat recovery of the remainder of the closure member, be experienced. The degree of expansion and thickness of the closure member 14 may be used advantageously in determining the fit between the channels 30 and the edges 22 and 24 both before and after recovery of the heat recoverable closure member 14. The closure member 14 will be thinner at the time the edges 22 and 24 are forced into the channels 30. Thus, the task of locating the edges 22 and 24 in the fastening means is made easier while the final assembly makes extraction of the edges 22 and 24 from the channels 30 very difficult.

Figure 2:
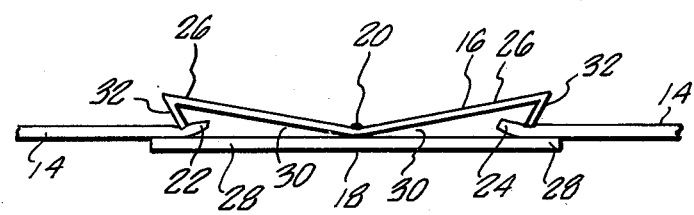
FIG. 2 is an end view of the closure assembly of FIG. 1.
Figure 3:
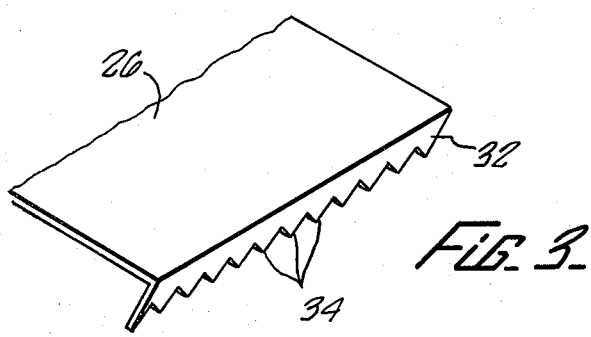
FIG. 3 is a detailed perspective view of one specific retaining configuration.

Looking now to further embodiments and features of the present invention, FIG. 3 illustrates a serrated flange 32 having a plurality of teeth 34. The plurality of teeth 34, when used with certain materials will tend to bite into the closure member 14 to effect a slight interlocking of the flange 32 with the edges 22 and 24 of the closure member 14. This interlocking is further emphasized by recovery of the closure member 14. As with the plain edge of the flange of the embodiment in FIGS. 1 and 2, recovery of the closure member 14 is somewhat inhibited by the pressure of the flange 32 on the recovering material. With the teeth 34 of the embodiment of FIG. 3, the pressure loading from the biasing force of the leg member 26 is increased. This will result in a greater tendency to prevent recovery of the closure member 14 and thereby increases the interlocking effect of the flange on the closure member 14. If sufficient bias force is exerted by the leg member 26, raising the temperature of the closure member 14 to the recovery range may actually result in further distortion of the closure member 14 at the flange 32 from the relaxed state of the sheet material. Such a result will further interlock the flanges 32 near the edges 22 and 24 in the closure member 14.

Figure 4:
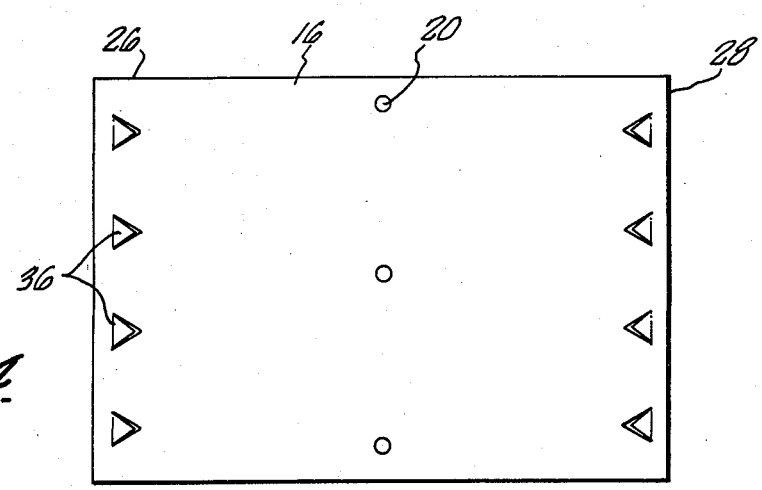
FIG. 4 is a top view of a fastening means illustrating a second retaining configuration.
Figure 5:
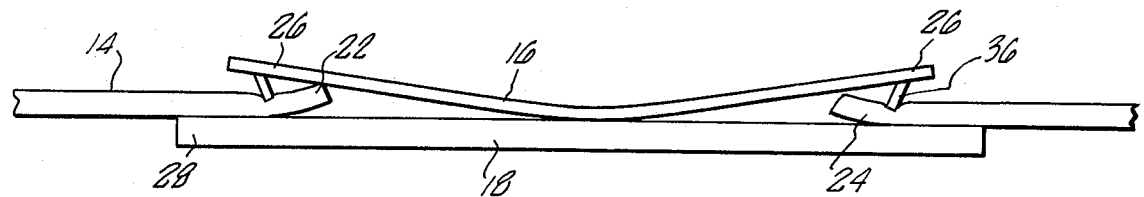
FIG. 5 is an end view of the specific embodiment of FIG. 4.
Figure 6:
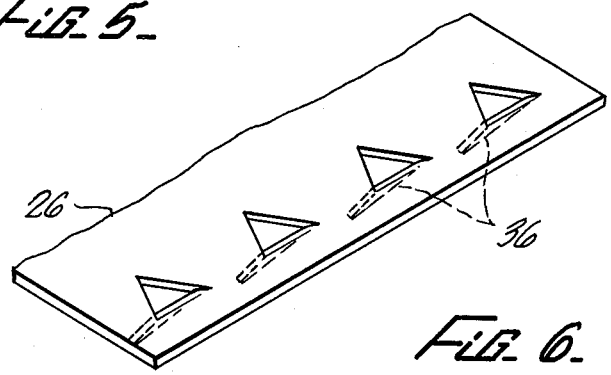
FIG. 6 is a detailed perspective view of the retaining device of the embodiment of FIG. 4.

FIGS. 4, 5 and 6 disclose yet another embodiment of the present invention. This embodiment incorporates teeth 36 formed directly from the first leg member 26 inwardly of the outer edge of leg member 26. The profile of each tooth 36 may be either pointed as shown or assume some other configuration. Semi-circular teeth would be less likely to puncture the closure member 14 if that was found to be a problem. The present invention contemplates the use of such teeth inwardly of the outer edge of the leg member 26 in a single row as shown, in multiple rows, in a staggered configuration and in combination with a flange 32.

The closure assembly of this invention can be used to seal or close the joint between pipes, for example a joint between pipe sections of a pipeline. In such an installation, the pipe may carry a fluid that is corrosive to the fastening means in which it might come in contact. In addition, the relatively rigid structure of the fastening means may not offer as effective a closure as would otherwise be desired. In such closures a protective seal between the fastening means and pipe union may be desirable. A closure assembly providing such as advantage is shown, as an end view, in FIG. 7.

Figure 7:
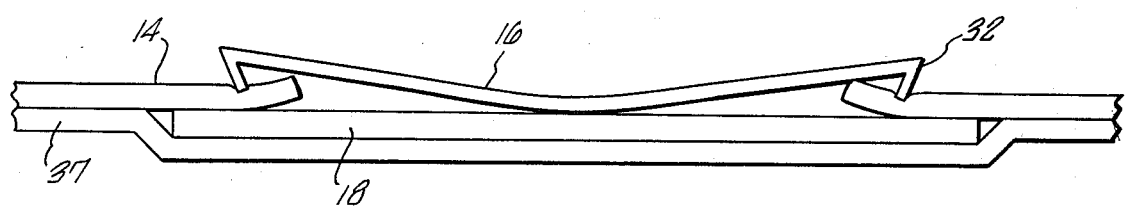
FIG. 7 is an end view of a closure assembly illustrating the use of a sealing member.

In FIG. 7, a fastening means such as that of FIGS. 1 and 2 is shown although other fastening means described herein can also be employed. The closure assembly differs from that of FIGS. 1 and 2 or 4 and 5 in that a sealing member, flap 37, has been provided. Sealing flap 37, made of the same heat recoverable material as closure member 14, is placed between the fastening means as shown and the pipe or other substrate (not shown). Preferably an adhesive layer is placed between sealing sealing flap 37 and closure member 14 in order to insure the integrity of the closure assembly. The sealing flap will normally be of about the same width as the closure member and fastening means. When the assembly is heat recovered, it conforms to the substrate in the same manner as the closure member itself.

Figure 8:
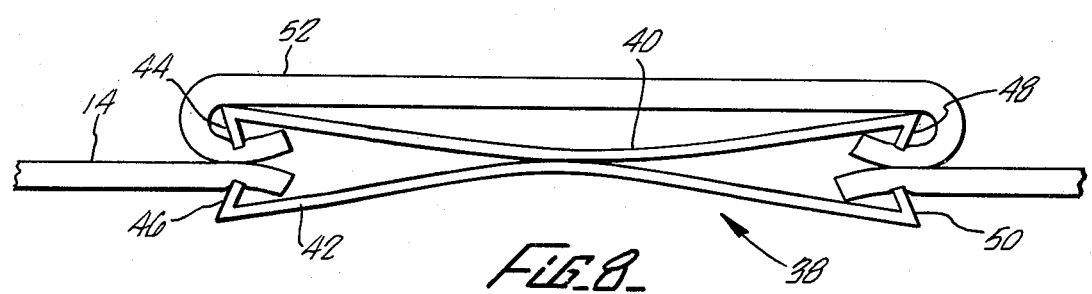
FIG. 8 is an end view of yet another embodiment of the closure assembly of the present invention.

There may also be situations in which the fastening means must be protected from the exterior environment. Closure assemblies having this capability are shown as end views in FIGS. 8 and 9. In FIG. 8, there is shown an assembly having a fastening means, generally designated 38, differing from that of FIGS. 1 and 2 in that both plates 40 and 42 of the device form flat springs and have retaining means. In this instance flanges 44, 46, 48 and 50 form a pair of retaining means for each channel of the device. The flanges may be provided with teeth, for example as shown in FIG. 3. A top sealing flap 52 is provided for the assembly. Its length is preferably the same as that of the fastening means and it is wide enough so that its edges can be readily inserted into the channels of the fastening means 38. The sealing flap will also be made of the same heat heat recoverable material as the closure member 14. Upon heat recovery, the sealing flap 52 tends to closely conform to the fastening means to provide protection for the fastening means.

Figure 9:
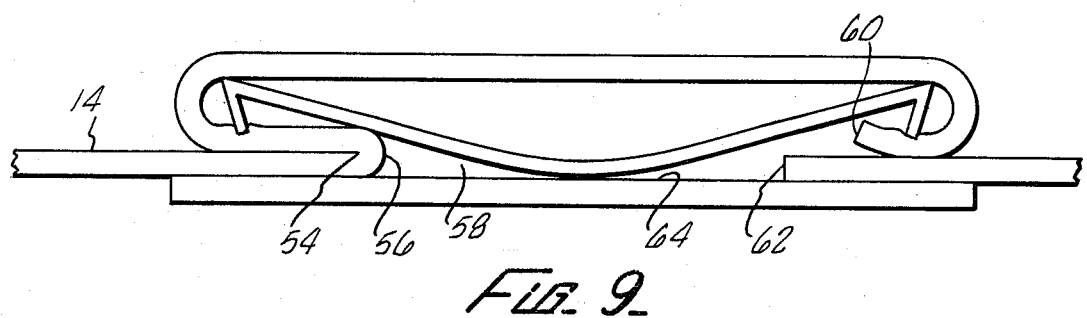
FIG. 9 is an end view of a variation on the embodiment of FIG. 8.

Referring now to FIG. 9, there is shown a closure assembly in which closure member 14 is used to make its own top sealing flap. The fastening means shown is like that of FIGS. 1 and 2 although that of FIGS. 4 and 5 or 8 can be employed equally as well.

As shown in FIG. 9, closure member 14 is folded widthwise at 54 and the fold inserted as one end 56 of the closure itself into channel 58. The balance of the length of closure member 14 is wrapped over the fastening means and its end 60 inserted with the other end 62 of the closure member into channel 64 to complete the assembly. Upon heat recovery, the sealing flap tends to closely conform to the fastening means to provide protection for the gripping device.

Figure 10:
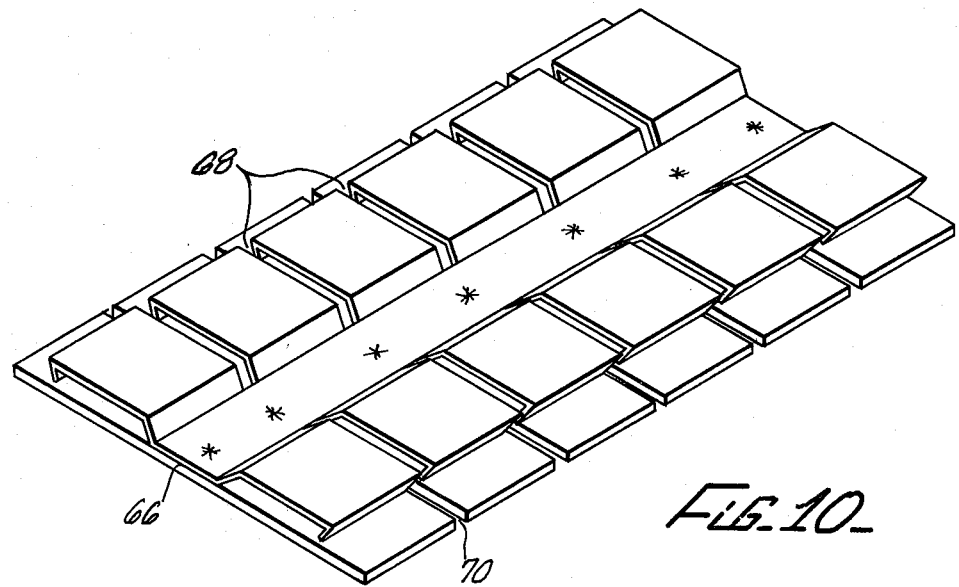
FIG. 10 is a perspective view of another embodiment of a fastening device of the present invention.
Figure 11:
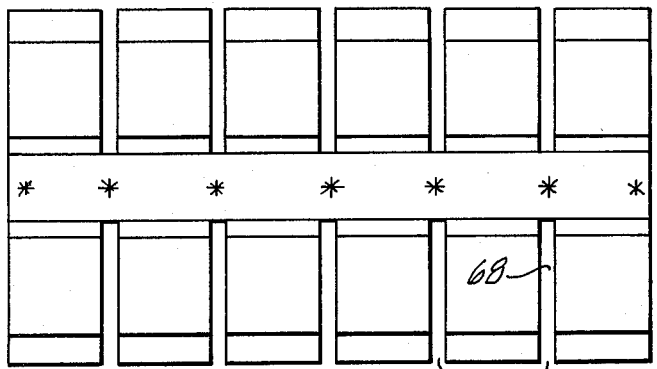
FIG. 11 is a top view of the fastening device of FIG. 10.

Other variations of the gripping device useful in this invention are shown in FIGS. 10-14. FIGS. 10 and 11 are views of a device 66 made from two plates similar to the device of FIGS. 1 and 2. However, the two plates are provided with slots 68 and 70. Such a device is particularly useful with large widths of closure material as it facilitates the insertions of the ends. It will be apparent to those skilled in the art that both plates can be provided with retaining means in the form of flanges as shown for the top plate or with teeth as shown in FIG. 6.

Figure 13:
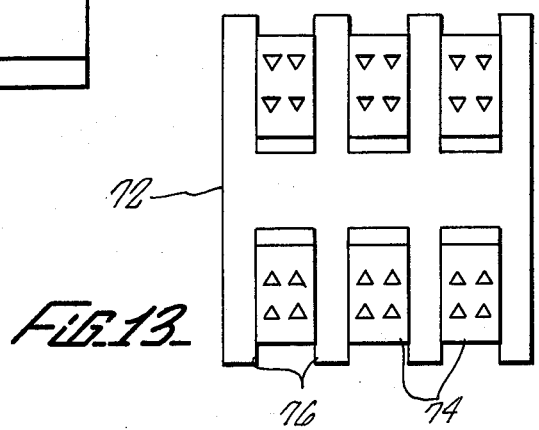
FIG. 13 is a top view of the fastening device of FIG. 12.
Figure 12:
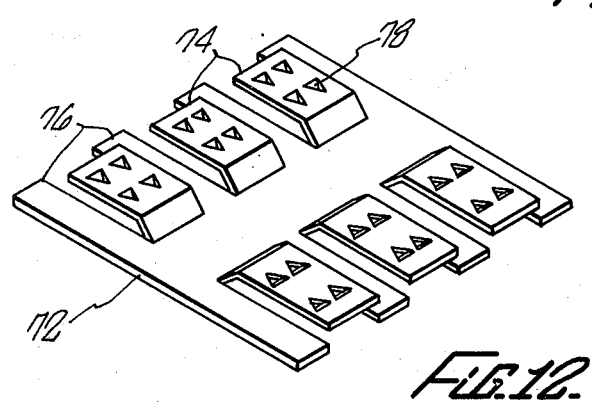
FIG. 12 is a perspective view of yet another fastening device of the present invention.
Figure 14:
FIG. 14 is an end view of the fastening device of FIG. 12.

Yet another fastening means is shown in FIGS. 12-14. Fastening means 72 differ from those already shown in that it can be fabricated from a single plate. As shown, fastening means 72 can be made by slitting a base plate, for example a metallic plate, to form a plurality of sections 74 and 76 as shown. Every other section can be deformed to provide channels for receiving the closure member. As shown, the retaining means is a double row of teeth 78 although a single row of teeth or a rolled edge, either smooth or serrated, can also be employed. A sealing flap 37 as shown in FIG. 7 may be used to seal the fastening means shown in FIGS. 12-14.

Although in the foregoing description of the invention, the gripping device has been described as if made of metal, any suitable material can be employed in its construction. Of metallic materials, corrosion-resistant steel is preferred. Suitable non-metallic materials include high temperature Bakelite, and Stilan polyarylene polymer made by Raychem Corporation.

In assembling the closure, the closure member 14 is wrapped about the elongated object to be enclosed, for example, a pipeline at a joint between sections, and the ends inserted into the channels of a fastening means, like those described, in a nearly abutting relationship. An adhesive may be employed between the closure member 14 and elongated object to insure a leakproof seal. An adhesive may also be employed between the closure member and its fastening means. Such adhesives are preferably heat activated in order to form a better seal during the heat recovery process.

When the closure assembly has been formed, heat is applied to the closure member 14 causing it to shrink about the object being enclosed. Thus there is provided by this invention a heat recoverable closure assembly that can be conveniently made to any desired size using heat recoverable material in a form that requires no pretreatment or special fabrication. The closure assembly of this invention can be used with a wide variety of substrates.

While embodiments and applications of this invention have been shown and described, it would be apparent to those skilled in the art that many more modifications are possible without departing from the inventive concepts herein described. The invention, therefore, is not to be restricted except by the spirit of the appended claims.

What is claimed is:

1. A heat recoverable closure assembly capable of being employed about a substrate for enclosure thereof, comprising
    a heat shrinkable closure member extending to edges capable of being brought into nearly abutting relationship; and
    fastening means for cooperating with the edges of said closure member to retain the edges in nearly abutting relationship such that tensile loads on said closure member will approach mutual alignment with constraining loads on said closure member from said fastening means including gripping means for retaining the edges of said closure member in nearly abutting relationship, each said gripping means having first and second leg members arranged together to define a channel for receipt of an edge of said closure member, means for forcing said leg members against said closure member near an edge thereof when interposed between said leg members and retaining means positioned within said channel and associated with at least one leg member for gripping said closure member when interposed in said channel.

2. The heat recoverable closure assembly of claim 1 wherein two said gripping means extend in opposite directions from one another.

3. The heat recoverable closure assembly of claim 1 wherein said means for forcing said leg members together include at least one of said leg members being resiliently biased toward the other of said leg members.

4. The heat recoverable closure assembly of claim 1 wherein said retaining means is integral with one of said leg members and extends toward the other of said leg members and inwardly against extraction of said closure member.

5. The heat recoverable closure assembly of claim 4 wherein said retaining means includes a flange at the outer end of said first leg member.

6. The heat recoverable closure assembly of claim 4 wherein said retaining means includes teeth extending from said first leg member toward said second leg member.

7. The heat recoverable closure assembly of claim 1 wherein said heat shrinkable closure member is capable of increasing in thickness upon heat recovery thereof.

8. The heat recoverable closure assembly of claim 1 wherein said fastening means includes two plates rigidly joined at their centerlines, said plates extending in either direction from their centerlines to form opposed gripping means, said first plate forming a first leg member for each said gripping means and said second plate forming said second leg member of each of said gripping means.

9. The heat recoverable closure assembly of claim 8 further comprising a protective sheet positionable between said fastening means and an enclosed substrate, said protective sheet extending beyond said leg members.

10. The het recoverable closure assembly of claim 9 further including adhesive on a first side of said protective sheet for adhering to said closure member.

11. The heat recoverable closure assembly of claim 8 further including a protective sheet disposed about said fastening means, the edges of said protective sheet extending into said channels.

12. The heat recoverable closure assembly of claim 1 wherein said leg members are discontinuous longitudinally along said fastening means.

13. The heat recoverable closure assembly of claim 1 wherein said fastening means includes a plate deformed to provide alternate flat and raised portions along the sides thereof to form said first and second leg member defining two longitudinal channels therebetween.

14. The heat recoverable closure assembly of claim 1 wherein the edges of said heat recoverable closure member extend into said gripping means and said closure member has been heat recovered about a substrate.

15. A heat recoverable closure assembly comprising heat shrinkable closure member extending to edges capable of being brought into nearly abutting relationship; and
fastening means for cooperating with the edges of said closure member to retain the edges in nearly abutting relationship such that closure member will extend to said fastening means in a nearly planar configuration at the edges thereof, said fastening means including gripping means for retaining the edges of said closure member in nearly abutting relationship, each said gripping means having first and second leg members arranged together to define a channel for receipt of an edge of said closure member, means for forcing said leg members against said closure member when interposed between said leg members and retaining means positioned within said channel and associated with at least one leg member for gripping said closure member when interposed in said channel.

16. A retaining device for joining two edges of heat recoverable closure member capable of being brought into nearly abutting relationship comprising
first and second gripping means for receipt of edges of the closure member, each said gripping means including first and second leg members arranged together to define a channel for receipt of an edge of the closure member, said channels extending in opposite directions from one another;
means for forcing said leg members of each said gripping means against the closure member when interposed between said leg members; and
retaining means positioned within said channel and associated with at least one leg member for gripping said closure member when interposed in said channel.

* * * * *